Feb. 6, 1962  D. E. MacLEOD ET AL  3,019,718
SEALING MEANS FOR WINDOW MOUNTED AIR CONDITIONING UNITS
Filed Sept. 29, 1958  3 Sheets-Sheet 1

INVENTORS
DAVID EARLE MACLEOD
CARL GEORGE ALT
BY
Herman Seid
atty.

Feb. 6, 1962 D. E. MacLEOD ET AL 3,019,718
SEALING MEANS FOR WINDOW MOUNTED AIR CONDITIONING UNITS
Filed Sept. 29, 1958 3 Sheets-Sheet 2

INVENTORS
DAVID EARLE MACLEOD
CARL GEORGE ALT
BY *Herman Seid*
Atty.

Feb. 6, 1962 D. E. MacLEOD ET AL 3,019,718
SEALING MEANS FOR WINDOW MOUNTED AIR CONDITIONING UNITS
Filed Sept. 29, 1958 3 Sheets-Sheet 3

INVENTORS
DAVID EARLE MACLEOD
CARL GEORGE ALT
BY
*Herman Seid*
atty.

United States Patent Office 3,019,718
Patented Feb. 6, 1962

3,019,718
SEALING MEANS FOR WINDOW MOUNTED AIR
CONDITIONING UNITS
David Earle MacLeod and Carl George Alt, Syracuse, N.Y., assignors to Carrier Corporation, Syracuse, N.Y., a corporation of Delaware
Filed Sept. 29, 1958, Ser. No. 764,114
13 Claims. (Cl. 98—94)

This invention relates to air conditioning units, more particularly to sealing means for use in conjunction with said units, when the units are mounted in a window, said sealing means functioning to close off the space between the side of the window and the side of the unit.

Air conditioning units have been evolved for use as an aid in providing desired temperature and humidity conditions in a given area. Generally, these units are positioned on a window sill, and a weather tight seal is provided between the window and the unit so as to prevent any undesired interchange of air between the ambient and the conditioned area. Installation of these units is a relatively complex matter requiring the services of skilled mechanics to insure proper installation. Thus when it is desired to move the unit from one window to another, or to reorient the unit in the same window, it is necessary to obtain the services of skilled mechanics. Contemporary manufacturing techniques and refrigeration technology have permitted substantial miniaturization of the components of the conventional air conditioning unit whereby the formerly relatively heavy unit has been made substantially portable. This portability permits the use of a single unit in a variety of different areas so that the home owner may employ a single unit for conditioning living areas during the daytime, and sleeping areas in the evening. Additionally, portability permits reversal of the conventionally formed unit so as to interchangeably expose either the heat dissipating condenser or cooling evaporator to the conditioned area to provide either heating or cooling as desired. These advantages of portability require however that no specific skills or techniques be employed in the installation of said unit and that effective sealing be readily obtainable in a variety of different sized windows.

It is with the above desiderata in mind that the present means have been evolved, means serving to provide a substantially weather tight seal of adjustable size between the sides of an air conditioning unit and the window in conjunction with which said unit is positioned.

It is accordingly a primary object of this invention to provide novel sealing means for use in positioning an air conditioning unit in operative position in a window.

Another object of the invention is to provide improved air conditioning unit sealing means not requiring any particular skills for the application thereof.

A further object of the invention is to provide a single sealing element for use in conjunction with the installation of an air conditioning unit in a window, said sealing element being adjustable for a variety of window sizes.

It is also an object of the invention to provide an air conditioning unit sealing element adapted to securely engage the window frame.

Another object of the invention is to provide removable and adjustable sealing means for use in the installation of an air conditioning unit in a window.

An additional object of the invention is to provide sealing means which may readily be moved with the unit in conjunction with which it is employed.

These and other objects of the invention which will become apparent from the following description and claims are achieved by provision of an adjustable panel member adapted to be extended between the air conditioning unit and the window track. The novel sealing means may be hinged to the side walls of the unit to be moved therewith. Adjustment of the dimensions of the sealing means may be provided by forming said means in an extensible fashion. Effective sealing may be attained by engaging the free end of said means in the window track to provide a substantially airtight seal employing novel track engaging means.

A primary feature of the invention resides in the provision of novel sealing means which may be hingedly secured to the side walls of an air conditioning unit permitting extension of the sealing means to accommodate the unit in a variety of different sized windows.

Another feature of the invention resides in the provision of sealing means with window frame engagement means on the free end thereof.

An additional feature of the invention resides in the provision of sealing means which may be hingedly secured to the side walls of an air conditioning unit facilitating the portability of said sealing means along with said unit.

The specific structural details of several preferred embodiments of the invention, along with their mode of functioning, will be made most manifest and particularly pointed out in conjunction with the accompanying drawings, wherein.

Referring now more particularly to the drawings, like numerals in the various figures will be taken to designate like parts.

Figure 1:
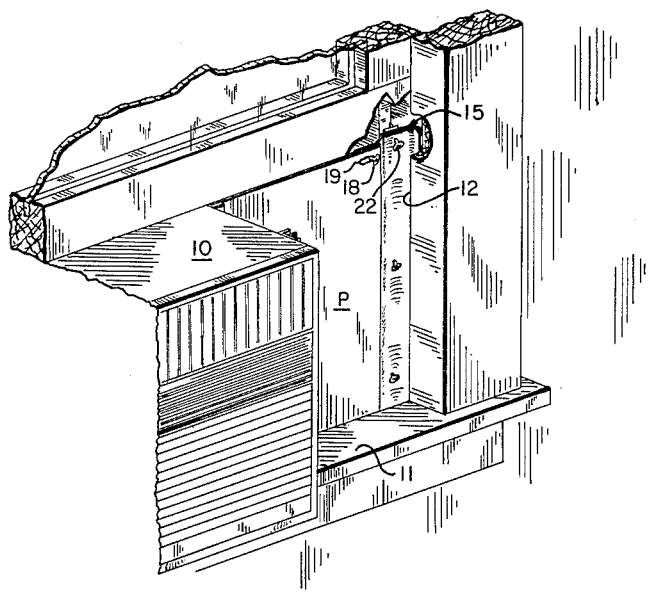
FIGURE 1 represents a perspective partial view of one side of an air conditioning unit shown positioned on a window sill with one embodiment of the novel sealing means arranged in operative position.

As best seen in FIGURE 1, an air conditioning unit 10 is shown positioned on a window sill 11 between the window tracks 12, only one of which is here shown. The drawing illustrates the conventional mounting of the conventional unit on the window sill. It will, however, be apparent that the same teachings may be employed in positioning the unit in a variety of other wall apertures.

Figure 2:
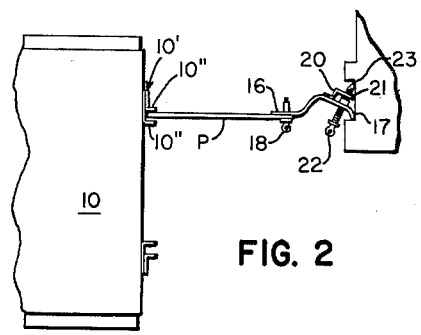
FIGURE 2 is a top plan view looking down on the partial detail seen in FIGURE 1.

As seen in FIGURES 1 and 2, a novel type of window track engaging means is disclosed. These track engaging means comprise a channel member 15 having a flange 16 and a leg 17. Flange 16 is provided with a tapped aperture for receiving adjusting thumb screw 18 which extends through a slotted aperture 19 in the panel P which is shown schematically as extended form unit 10. Leg 17 has secured thereto bracket 20, and a threaded aperture is formed in leg 21 of bracket 20, aligned with a similar threaded aperture in leg 17. Extending through these threaded apertures is engaging thumb screw 22 having a conical point 23 formed on the end thereof. A track 10' is attached to casing 10 and includes engaging lip members 10" extending at substantially right angles to the wall of the casing to receive the opposite end of panel P. Preferably, members 10" are flexible and resilient so that panel P when inserted in the track is securely held in desired position.

Figure 3:
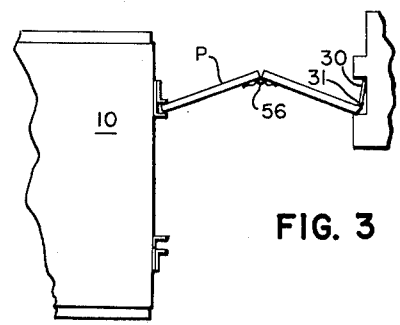
FIGURE 3 is a schematic top plan view of another embodiment of sealing means similar to that shown in FIGURE 1 having an alternative form of window track engaging means.
Figure 4:
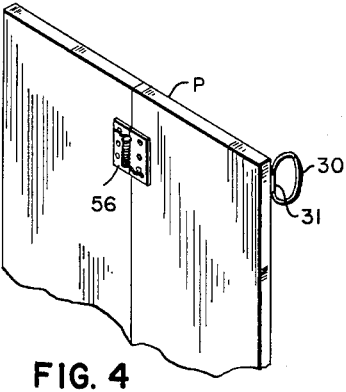
FIGURE 4 is a perspective detail view of the novel window track engaging means of FIGURE 3.

An alternative embodiment of the track engaging means is best seen in FIGURES 3 and 4. This embodiment of the engaging means comprises a ring member 30 made up of a spring-like material such as spring steel or the like. One or more of these rings 30 are mounted on the free end of a panel P extended from air conditioning unit which it is desired to seal in position. The rings 30 are secured to the panel P by means of a strap 31 fastened to the panel and extending over a portion of the ring to maintain same in the position illustrated in FIGURE 4. In the embodiment of the panel illustrated in FIGURE 3, preferably, the panel P is made up of two sections secured together by a spring hinge 56 which serves to provide for adjustability, permitting the panel to be snapped into desired position between the unit 10 and the window track.

Figure 5:
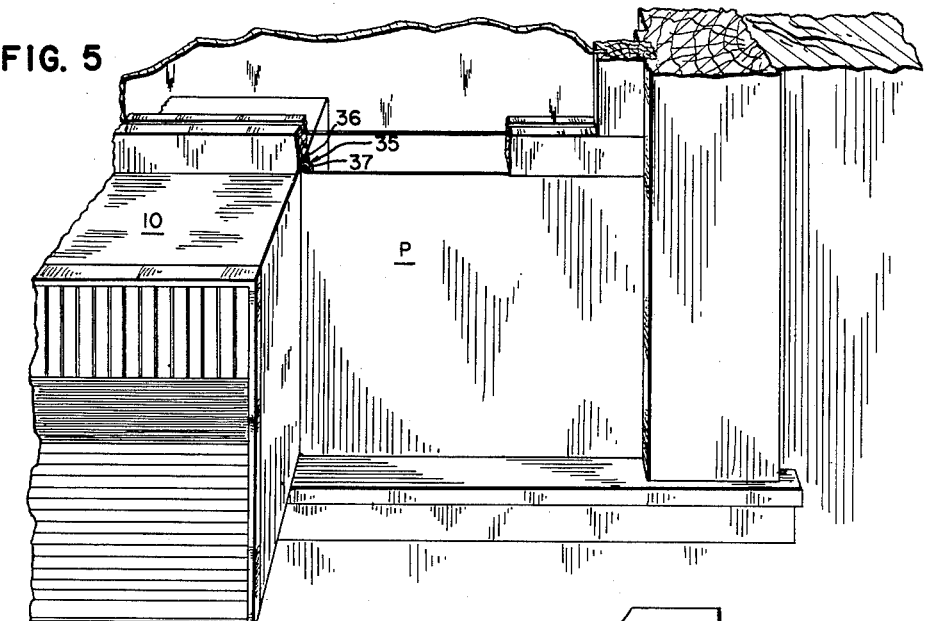
FIGURE 5 is a perspective view of an air conditioning unit illustrating a suggested mode of securement of sealing means to said unit.
Figure 6:
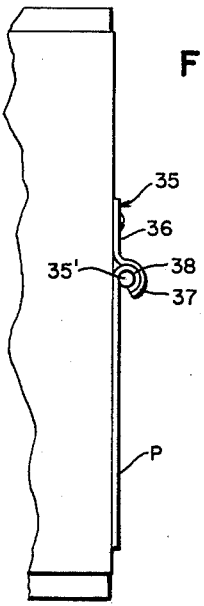
FIGURE 6 is a partial top plan view of the sealing means fastening arrangement of FIGURE 5 with the sealing means shown in position against the side of the unit.

FIGURES 5 and 6 illustrate one embodiment of means for securing the sealing panel to the air conditioning unit. In this embodiment of the invention a clamping plate 35 having a flat portion 36 and a hook portion 37 is secured to one side of the unit. One end of panel member P is curled back on itself as at 38, and this curled edge is inserted beneath hooked portion 37 of clamping plate 35, a pin 35' holding the portions together as shown. Clamping plate 35 is made of a resilient material so as to provide a spring action against curled portion 38 of panel P.

Figure 7:
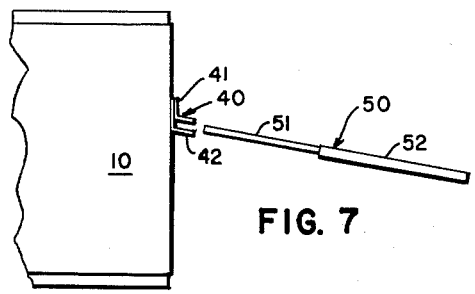
FIGURE 7 is a top plan view of the novel sealing means illustrating how they may be made extensible.

FIGURE 7 illustrates an alternative embodiment of securing means for securing the sealing panel P to the air conditioning unit. In this embodiment, a channel 40 having base flanges 41 is secured to the side walls of the unit 10. Upstanding from this base flange 41 and at an angle to the casing other than a right angle are gripping lips 42 spaced apart a distance sufficient to tightly grip the panel P. Securing means 40 are preferably made up of a flexible resilient material such as rubber or the like. Thus the opposite end of panel P may be held securely against a wall of the window track.

Figure 8:
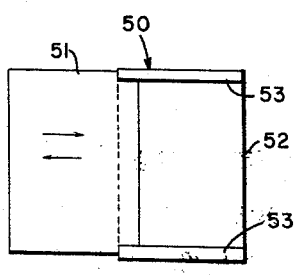
FIGURE 8 is a schematic elevational view of the extensible panel illustrated in FIGURE 7.

FIGURES 7 and 8 also illustrate one embodiment of an extensible panel 50 adapted to be extended between the unit 10 and the side of the window in which the unit is mounted. Panel 50 comprises an inner portion 51 and an outer portion 52 telescoping thereover. The panel member may be made up of any sort of sheet material such as steel, plastic or the like. Outer portion 52 is provided with tracks 53 at each edge thereof whereby inner portion 51 may slide with respect thereto.

Figure 9:
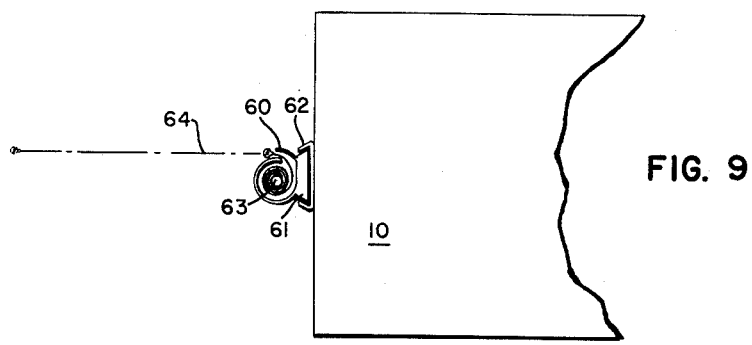
FIGURE 9 is a schematic partial top plan view of an alternative embodiment of the sealing means permitting extensibility of said sealing means.

An alternative embodiment of the extensible panel is seen in FIGURE 9 where a case 60 having a mounting foot 61 is secured to the side wall of the unit 10 by means of a bracket 62 which is suitably fastened to the side wall of the unit 10, and slidably receives foot 61 to slidably secure case 60 to the unit. Within case 60 a roller 63 is rotatably pivoted and spring biased. Wound about roller 63 is a curtain or screen 64 of an impervious material, said curtain being wound in a direction opposite to the spring biasing whereby the curtain may be unwound from the roller, causing the spring to exert a greater biasing force in an opposite direction. The free end of screen 64 is provided with suitable engaging means for engaging in the window track as, for example, the engaging means illustrated in FIGURE 2 or in FIGURE 3.

Figure 10:
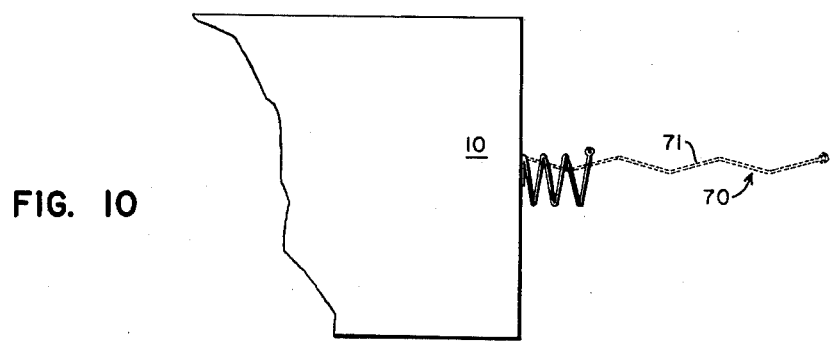
FIGURE 10 is a partial top plan view of an alternative embodiment providing for extensible sealing means.

In the embodiment of the extensible panel illustrated in FIGURE 10, the panel 70 comprises a folding curtain made up of a plurality of rigid members 71 encased in a flexible envelope which forms a hinge between said rigid members 71. One end of the folding curtain is suitably secured to the unit 10, and the other end provided with suitable track engaging means as, for example, the engaging means illustrated in FIGURE 2.

Figure 11:
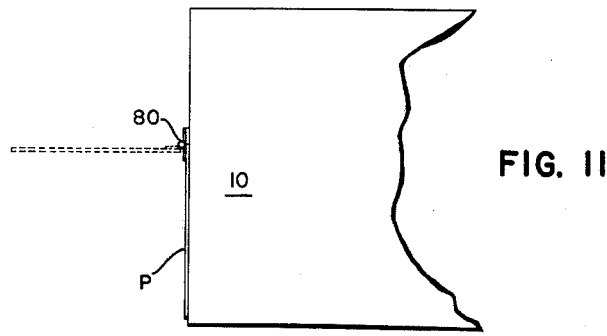
FIGURE 11 is a partial top plan view of an alternate embodiment of the sealing means.

In FIGURE 11, there is shown a panel P preferably attached to casing 10 by means of two or more spring hinges 80 riveted to the top and bottom of the casing. It will be appreciated panel P may be extensible if desired as taught herein to fit within the window track.

A variety of sealing means have been disclosed to facilitate the installation of an air conditioning unit on a window sill with effective closure of the space between the sides of the unit and the window track to prevent the interchange of air from the ambient and the conditioned area. This is accomplished by one of a variety of panel members extensible between the sides of the unit and the window track; arringing engaging means of one of the variety of disclosed types of engaging means on one end of said panel members; and arranging one of the variety of securing means on the other end of said panel member for securing said member to the sides of the unit.

The novel sealing means functions to permit rapid and removable installation of an air conditioning unit in a window sill. The securing means permits the unit, in combination with the sealing means, to be moved with a great deal of facility, while the panel members may readily be extended to close off a wide variety of window opening. The engaging means are manually operable to implement assembly and disassembly of the sealing means.

In FIGURE 1, a complete air conditioning unit installation is shown in which unit 10 is mounted on window sill 11 between window tracks 12. The sealing means of this embodiment of the invention comprises a panel extensible between the side walls of the unit 10 and the window track 12. The particular type of panel is not shown but may be selected from any one of the variety of panels as illustrated in FIGURES 3, 8, 9, or 10. Securing means for attaching one end of the panel to the unit 10 may be of the type illustrated in FIGURES 2 and 3. Engaging means are provided at the free end of the panel member in the form of a thumb screw 22 passing through a channel member 15 adjustably secured to the panel member. Operative positioning of the unit 10 on the window sill 11 is accomplished by extending the panel member from the side of the unit to the window track. Thereafter, in the FIGURE 1 embodiment of the invention, adjusting thumb screw 18 is loosened to permit positioning of channel 15 against the inside flange of the window track as viewed in FIGURE 2, and is tightened. Engaging thumb screw 22 is then tightened to bear against the rear flange of the window track. It will be noted that adjustability of the distance between the unit and the window track may be accomplished solely at channel 15 by means of adjusting screw 18.

It is thus seen that novel sealing means have been provided in which a variety of extensible panel members may be employed to close off the opening between the side of an air conditioning unit and the window track. Additionally a variety of securing means have been provided for engaging the novel panel to the sides of the unit to permit the panel and the unit to be moved together; and a variety of novel engaging means have been disclosed for operatively positioning the panel member.

The above disclosure has been given by way of illustration and elucidation, and not by way of limitation, and it is desired to protect all embodiments of the herein disclosed inventive concept within the scope of the appended claims.

We claim:

1. Sealing means for closing off the space between the side of an air conditioning unit and a side track of a window within which the air conditioning unit is mounted, said sealing means comprising panel means extending between said side of said air conditioning unit and said side track of the window; securing means for securing one end of the panel means to the side of said air conditioning unit; and engaging means on the other end of the panel means gripping said side track of the window, said engaging means comprising a channel means, a flange on one edge of said channel means, means forming a threaded aperture in said flange, means defining an aperture in said panel means, fastening means extending through said aperture in said panel means into said threaded aperture to secure said channel means to said panel means, means defining a tapped aperture in said channel means, and a screw member extending through said tapped aperture in said channel means into engagement with the side track, said screw member cooperating with said channel means to wedge the channel means in the side track.

2. Sealing means as in claim 1 in which said securing means comprise: a clamping plate adapted for securement to the unit; a hook portion formed on said plate and extending outwardly therefrom at a spaced distance from the unit; and a curled edge formed on said panel means and extended beneath said hook portion.

3. Sealing means as in claim 2 in which said clamping plate is formed of a resilient material whereby said hook portion exerts a spring action against said curled portion on the panel means.

4. Sealing means as in claim 1 in which said securing means comprise: a channel including a base flange adapted for engagement with the side of the unit and gripping lips adapted to engage the panel means.

5. Sealing means as in claim 4 in which said gripping lips are flexible and extend at an angle other than a right angle to said casing whereby the lips will be biased into contact with said panel means when the panel means is placed in position in the installation.

6. Sealing means as in claim 1 in which said panel means comprise an inner portion; and an outer portion telescoping thereover.

7. Sealing means as in claim 6 in which track means are formed at the edge of the outer portion, whereby the inner portion may slide with respect thereto.

8. Sealing means as in claim 1 in which said panel means comprise a flexible curtain; and a roller supporting said curtain.

9. Sealing means as in claim 8 in which said securing means comprise a bracket fixed to the sidewalls of the unit; said panel means includes a case; a foot on said case slidable in said bracket; a spring biased roller in said case; and a curtain on said roller.

10. Sealing means as in claim 1 in which said panel means comprise: a plurality of rigid members; and a flexible casing enclosing said rigid members to form a flexible curtain.

11. Sealing means for closing off the space between an air conditioning unit and a side track of a window within which the air conditioning unit is mounted, said sealing means comprising panel means extending between a side of said unit and said side track of the window, securing means for securing the panel means to said side of said unit, and engaging means on the panel means gripping said side track of the window, said engaging means comprising a member secured to the panel means, means forming a tapped aperture in said member, and a conically pointed thumb-screw extending through said tapped aperture in said member, said member engaging a portion of said side track and said thumb-screw engaging another portion of the side track to wedge the member in said side track.

12. Sealing means for closing off the space between one side of an air conditioning unit and a side track of a window within which the unit is mounted, said sealing means comprising: panel means extending between said one side of the air conditioning unit and a side track of the window, said panel means including a case, a foot on said case, a spring-biased roller in said case, and a curtain on said roller; securing means including a bracket fixed to the side wall of said unit, said foot being slidable in said bracket to detachably support the case on the air conditioning unit; and engaging means on said curtain gripping a side track of the window.

13. Means for closing off the space between the side of an air conditioning unit and a side track of a window within which the air conditioning unit is mounted comprising panel means extending between said side of said air conditioning unit and said side track of the window and means for securing one end of the panel means to said side of said air conditioning unit, the other end of said panel means abutting said side track, said securing means comprising a channel including a base flange adapted for engagement with said side of the unit and gripping lips adapted to engage the panel means, said gripping lips being flexible and extending from said base flange at an angle other than a right angle to said casing whereby the gripping lips will be biased into contact with said panel means when the panel means is placed in position in the window.

References Cited in the file of this patent

UNITED STATES PATENTS

| | | |
|---|---|---|
| 2,052,453 | Dollinger | Aug. 25, 1936 |
| 2,120,208 | Paschal | June 7, 1938 |
| 2,316,640 | Williams | Apr. 13, 1943 |
| 2,523,249 | Kubatzky | Sept. 19, 1950 |
| 2,781,717 | Hord | Feb. 19, 1957 |
| 2,814,244 | Hord | Nov. 26, 1957 |
| 2,818,793 | Hord | Jan. 7, 1958 |